(12) United States Patent
West et al.

(10) Patent No.: US 8,088,318 B2
(45) Date of Patent: Jan. 3, 2012

(54) METHOD FOR PROCESSING AN INTERIOR TRIM COMPONENT

(75) Inventors: Michael A. West, Howell, MI (US); Ryan R. Case, Pinckney, MI (US); Steven D. McClintock, South Lyon, MI (US)

(73) Assignee: Magna International Inc., Aurora (CA)

( * ) Notice: Subject to any disclaimer, the term of this patent is extended or adjusted under 35 U.S.C. 154(b) by 1244 days.

(21) Appl. No.: 11/758,463

(22) Filed: Jun. 5, 2007

(65) Prior Publication Data

US 2008/0305327 A1 Dec. 11, 2008

(51) Int. Cl.
*B29C 45/15* (2006.01)
*B29C 45/16* (2006.01)

(52) U.S. Cl. ........ 264/234; 264/255; 264/327; 264/347; 264/DIG. 65; 264/DIG. 71

(58) Field of Classification Search .................... None
See application file for complete search history.

(56) References Cited

U.S. PATENT DOCUMENTS

| | | | | |
|---|---|---|---|---|
| 4,004,868 A | * | 1/1977 | Ohdate | 425/130 |
| 4,030,953 A | * | 6/1977 | Rutschow et al. | 156/79 |
| 4,207,049 A | * | 6/1980 | Malo et al. | 425/129.1 |
| 5,736,090 A | * | 4/1998 | Yamamoto et al. | 264/255 |
| 6,432,350 B1 | * | 8/2002 | Seres et al. | 264/500 |
| 6,617,033 B1 | | 9/2003 | Straus et al. | |
| 6,676,877 B2 | | 1/2004 | Thompson | |
| 6,793,861 B2 | * | 9/2004 | McBain et al. | 264/255 |
| 6,875,389 B2 | * | 4/2005 | Straus et al. | 264/255 |
| 6,884,056 B2 | | 4/2005 | Thompson | |
| 6,887,550 B2 | | 5/2005 | Straus et al. | |
| 6,890,469 B2 | | 5/2005 | Straus et al. | |
| 7,045,213 B2 | | 5/2006 | Straus | |
| 7,105,231 B2 | | 9/2006 | McBain et al. | |
| 2004/0148051 A1 | | 7/2004 | Straus | |
| 2004/0201132 A1 | * | 10/2004 | Okahara et al. | 264/255 |
| 2005/0156351 A1 | | 7/2005 | Straus et al. | |
| 2006/0076712 A1 | * | 4/2006 | Yonemochi et al. | 264/255 |
| 2006/0125151 A1 | | 6/2006 | McBain et al. | |
| 2007/0138667 A1 | * | 6/2007 | Dang et al. | 264/1.32 |

* cited by examiner

*Primary Examiner* — Edmund H. Lee
(74) *Attorney, Agent, or Firm* — Honigman Miller Schwartz and Cohn LLP

(57) ABSTRACT

A method for processing an interior trim component includes the steps of injecting a substrate into a cavity that is defined by a cavity surface; injecting a coating onto the substrate within the cavity; flash-heating the cavity surface; and curing the coating on the substrate. A system is also disclosed.

12 Claims, 3 Drawing Sheets

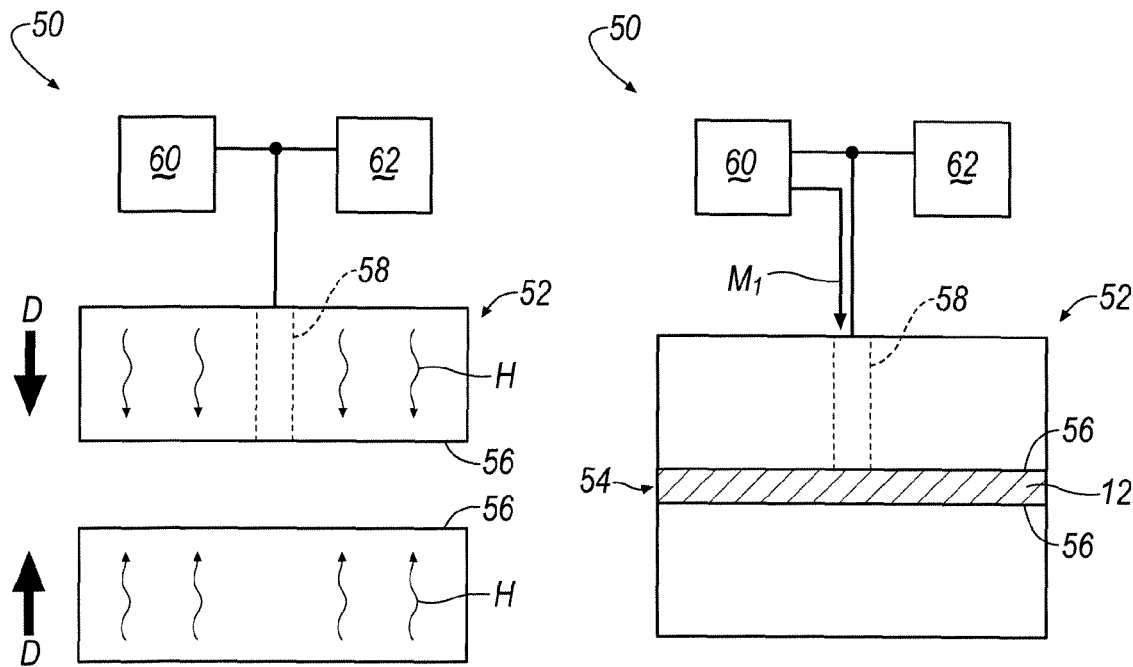
FIG. 1A
FIG. 1B
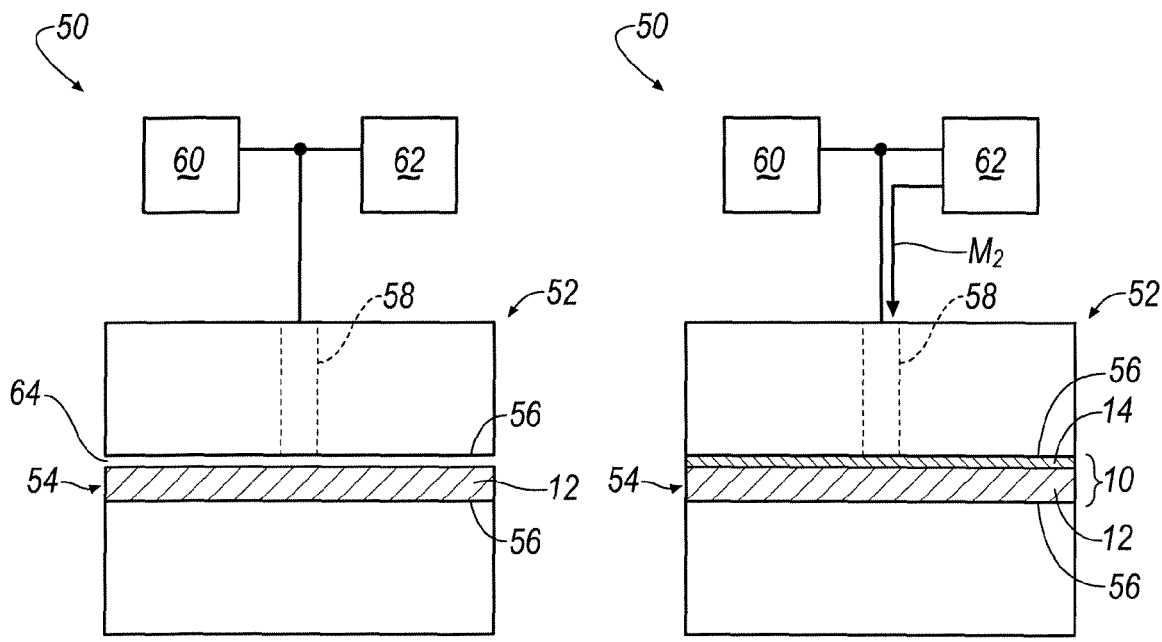
FIG. 1C
FIG. 1D

METHOD FOR PROCESSING AN INTERIOR TRIM COMPONENT

TECHNICAL FIELD

The invention relates in general to a method and system for processing an interior trim component.

BACKGROUND

It is known in the art that vehicles, such as, for example, automotive vehicles, include interior trim components. Typically, an interior trim component provides a rigid and/or soft, aesthetically-pleasing surface that trims structure of a vehicle, such as, for example, roof structure, door structure, instrument panel structure, A-pillars, B-pillars, C-pillars, or the like.

Because of global competitive forces, there is a continuous need to increase the processing efficiency in almost every manufacturing industry. As such, a need exists in the art for a method and system that maximizes the processing efficiency of an interior trim component.

BRIEF DESCRIPTION OF THE DRAWINGS

The disclosure will now be described, by way of example, with reference to the accompanying drawings, in which:

FIGS. 1A-1G illustrate a representative view of a system for processing an interior trim component in accordance with an exemplary embodiment of the invention.

DETAILED DESCRIPTION

Figures 1E, 1F:
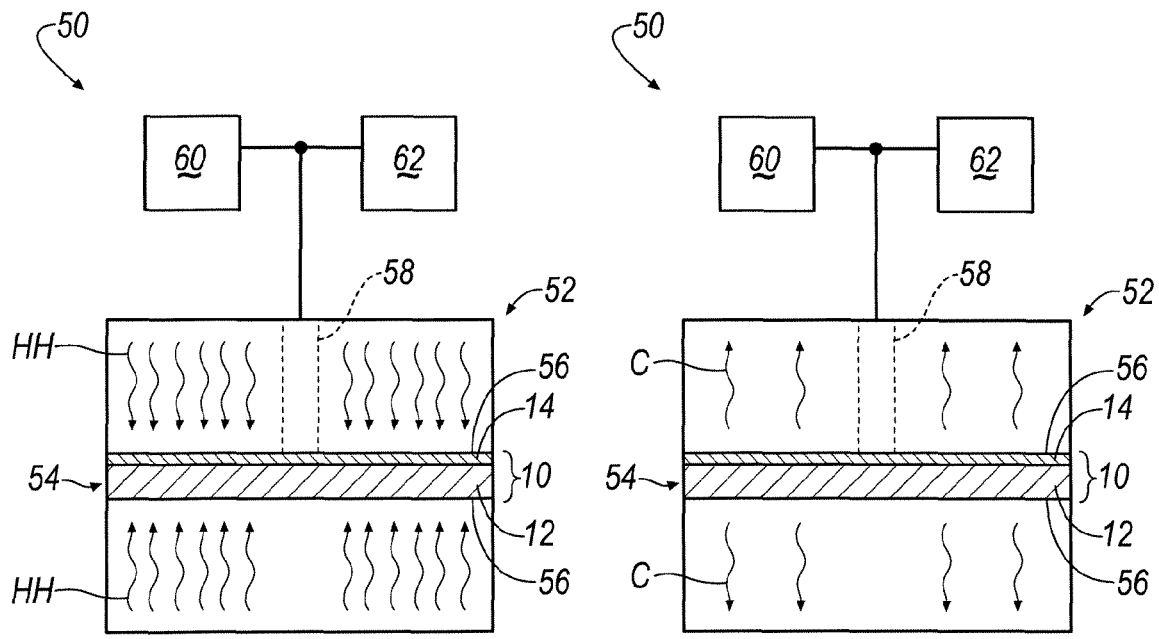

The Figures illustrate an exemplary embodiment of a method and system for processing an interior trim component in accordance with an embodiment of the invention. Based on the foregoing, it is to be generally understood that the nomenclature used herein is simply for convenience and the terms used to describe the invention should be given the broadest meaning by one of ordinary skill in the art.

Referring to FIGS. 1A-1G, a system for processing an interior trim component 10 (FIG. 1G) is shown generally at 50 according to an embodiment. In general, the interior trim component 10 includes a substrate 12 and a coating 14 disposed thereover.

According to an embodiment, the coating 14 may be, for example, an "A-surface" or a "show surface" that functions as a decorative or aesthetically-pleasing layer facing a passenger compartment area (not shown) of a vehicle whereas the substrate 12 may, according to an embodiment, face vehicle structure (not shown). Although the interior trim component 10 is illustrated to include two layers 12, 14, it will be appreciated that the interior trim component 10 is not limited to include two layers 12, 14 and may include any desirable number of layers, defined by any desirable type of geometry, material, and the like.

Referring to FIGS. 1A-1G, the system 50 for processing the interior trim component 10 may be defined by several processing steps that are conducted by one or more devices. In an embodiment, the steps are carried out by a single device as is shown generally at 52. According to an embodiment, the device 52 is defined to generally include a molding apparatus. The molding apparatus 52 may include any desirable molding tool, such as, for example, an injection molding tool, a compression molding tool, or the like.

The molding apparatus 52 defines a volume or cavity 54 (FIGS. 1B-1F) and a cavity surface 56. According to an embodiment, the molding apparatus 52 may also include a channel or opening 58.

According to an embodiment, the system 50 includes a plurality of hoppers that are shown generally at 60, 62. As illustrated, the channel or opening 58 is in fluid communication with the cavity 54 and the hoppers 60, 62.

According to an embodiment, the hopper 60 retains or stores material that is associated with the substrate layer 12 (see, e.g., FIG. 1B) whereas the hopper 62 retains or stores material that is associated with the coating layer 14 (see, e.g., FIG. 1D). Injection of the substrate 12 and coating 14 and further operation of the system 50 is explained in greater detail hereinbelow and as representatively depicted in FIG. 2.

Figure 1G:
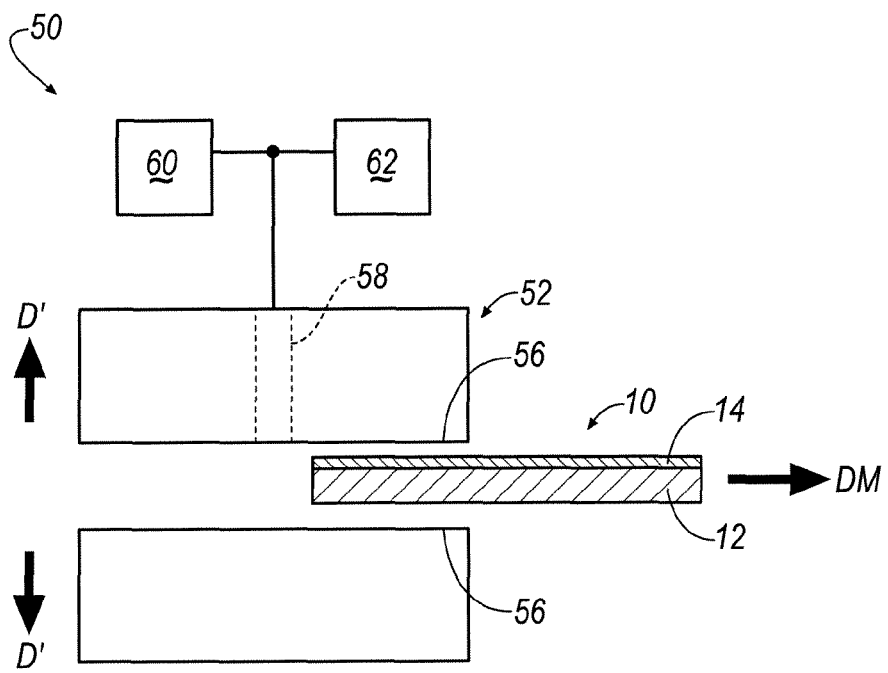
Figure 2:
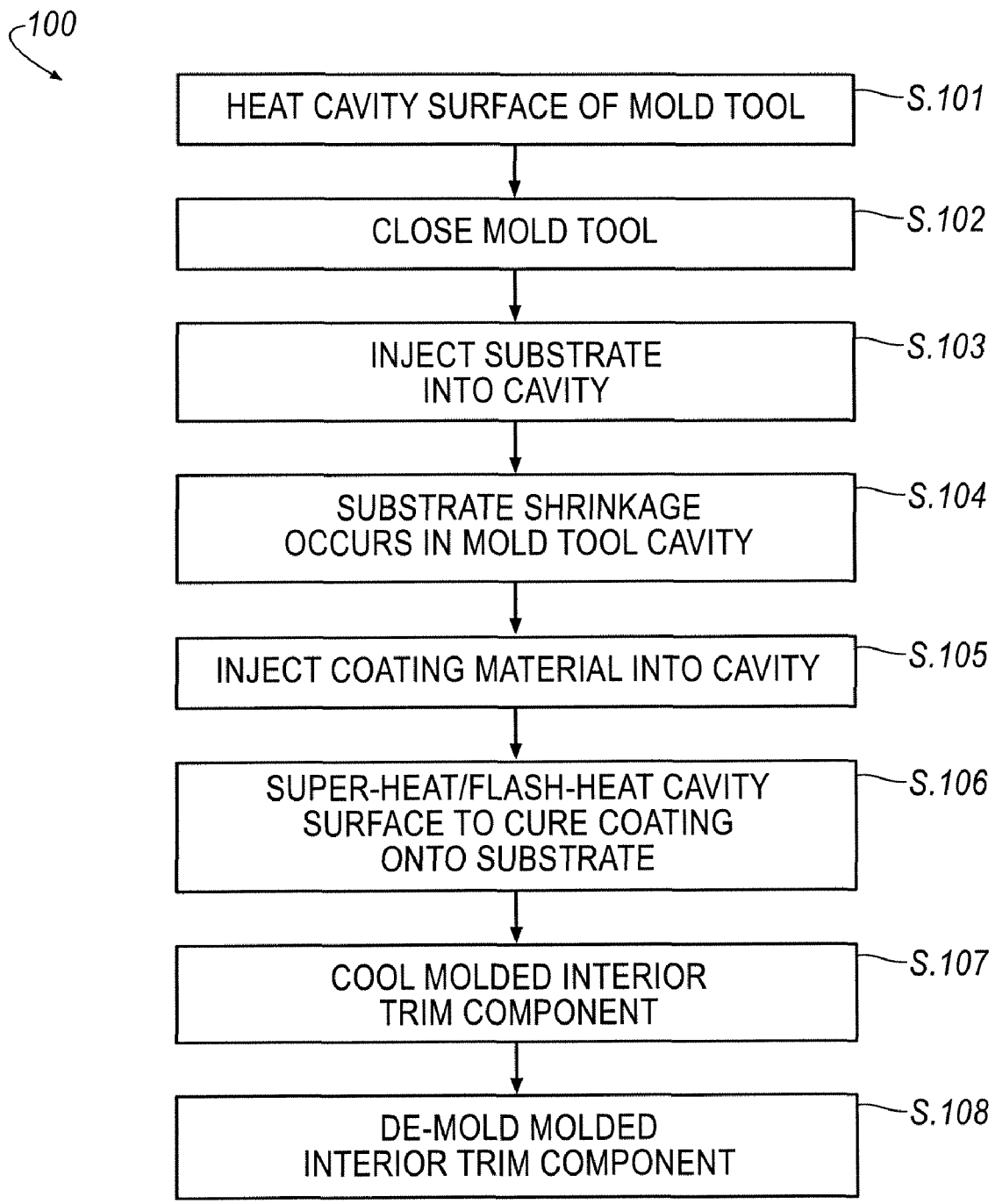
FIG. 2 is a method for processing the interior trim component in accordance with an exemplary embodiment of the invention.

Referring now to FIG. 2 (in conjunction with FIGS. 1A-1G), a method for processing the interior trim component 10 is shown generally at 100 according to an embodiment. It will be appreciated that the method 100 should not be limited to the processing of a particular geometry of an interior trim component 10. According to an embodiment, the cavity surface 56 may include any desirable shape that defines any desirable interior trim component geometry. For example, the geometry of the cavity surface 56 may be defined to provide an interior trim component 10 including door trim, a door bolster, or the like. Alternatively, the geometry of the cavity surface 56 may be defined to provide an interior trim component 10 including pillar trim, defined by, for example, A-, B-, C-pillar trim, or the like; or an interior trim component 10 including an instrument panel trim or the like. Thus, it will be appreciated that the molding apparatus 52 may include a cavity surface 56 that defines the geometry of any desirable interior trim component 10.

In general, the method 100 includes steps, S.101-S.108. First, at step, S.101, the cavity surface 56 of the molding apparatus 52 is heated, H (FIG. 1A). Then, at step, S.102, the molding apparatus 52, which may be defined by, for example, an upper mold half and a lower mold half, is reconfigured from an open position (FIG. 1A) to a closed position (FIG. 1B) by moving the upper and lower mold halves in a direction according to arrows, D (FIG. 1A). Alternatively, if desired, the heating, H, of the cavity surface 56 may be conducted after the mold halves are moved from the open position to the closed position (i.e., steps, S.101, S.102 may be reversed).

When the mold halves are moved to the closed position, the cavity 54 is defined by a volume that receives, at step, S.103, an injection or shot of material according to the direction of arrow, M1 (FIG. 1B), from the hopper 60 by way of the channel or opening 58. According to an embodiment, the material from the hopper 60 is defined by the substrate 12.

Once the injection or shot of substrate 12 is provided into the cavity 54, the substrate 12 may, according to an embodiment, expand to fill the volume defined by the cavity 54, and then, according to an embodiment, at step, S.104, undergo shrinkage to thereby define a cavity sub-volume, which is shown generally at 64 (FIG. 1C). When the cavity sub-volume 64 is provided, the cavity sub-volume 64 receives, at step, S.105, an injection or shot of material according to the direction of arrow, $M_2$ (FIG. 1D), from the hopper 62 by way of the channel or opening 58. According to an embodiment, the material from the hopper 62 defines the coating 14. Thus, steps S.103-S.105 may define, for example, a "two shot" injection molding operation that subsequently defines a two-layer interior trim component 10.

Once the injection or shot of coating 14 fills the cavity sub-volume 64, at step, S.106, the cavity surface 56 is super- or flash-heated, HH (FIG. 1E). Super- or flash-heating, HH, includes a method of providing 'instant heat' to the cavity surface 56. According to an embodiment, super- or flash-heating includes the step of increasing the temperature of the cavity surface 56 from 110° F. to 520° F. within, for example, a window of time approximately equal to 15-to-20 seconds. Because the cavity surface 56 is super- or flash-heated, HH, to approximately 520° F., the coating 14 is able to cure onto the substrate 12, as described in greater detail below.

Optionally, at step, S.107, the cavity surface 56 is cooled, C (FIG. 1F). According to an embodiment, the molding apparatus 52 may include cooling lines positioned proximate to the cavity surface 56. For example, once the coating 14 has cured, the cooling step, S.107 may be conducted by permitting a flow of cold water through the cooling lines to extract heat from the cavity surface 56.

Finally, at step, S.108, the molding apparatus 52 is moved from the closed position (FIG. 1F) to an opened position (FIG. 1G) in a direction according to arrows, D' (FIG. 1G), which is opposite the direction of the arrow, D, so that the molded interior trim component 10 may be removed/demolded from the molding apparatus 52 according to the direction of arrow, DM (FIG. 1G).

According to an embodiment, the substrate 12 may be defined, in whole or in part, by a crystalline-based material. Any desirable crystalline-based material 12 may be utilized, such as, for example, polypropylene (PP), PP with glass fibers, PP with talc resin, thermoplastic olefin (TPO), thermoplastic urethane (TPU), thermoplastic elastomer (TPE), or the like. According to an embodiment, crystalline-based materials have a relatively high glass transition temperature; accordingly, the super- or flash-heating of the mold surface 56 described above permits the crystalline-based material 12 to be maintained above its glass transition temperature (i.e., the temperature at which a material solidifies) while in cavity 54 to permit that coating 14 to cure and bond to the crystalline-based material when it is maintained above its glass transition temperature.

According to an embodiment, the coating 14 may include any desirable material, such as, for example, a clear primer, an in-mold coating (IMC), or topcoat sold under the trade-name LENSGARD®, which is commercially available from, for example, Nippon Bee (NB) Chemical Co. Corporation of Lansing, Ill. It will be appreciated that the interior trim component 10 is not limited to a particular material defining the substrate 12 or coating 14 and that any material may be utilized to define the desirable substrate 12 or coating 14.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method for processing an interior trim component in cavity of a mold tool, wherein the cavity is defined by a cavity surface having a cavity surface temperature, comprising the steps of:
   heating the cavity surface such that the cavity surface temperature is equal to a first temperature;
   injecting a substrate into the cavity such that the substrate contacts the cavity surface;
   injecting a coating onto the substrate that is located within the cavity;
   after the injecting the coating step, flash-heating the cavity surface such that the cavity surface temperature is increased to a second temperature that is greater than the first temperature; and
   as a result of the flash-heating step, curing the coating on the substrate.

2. The method according to claim 1, wherein the substrate is a crystalline-based material defined by a glass transition temperature, wherein the flash-heating step includes the step of
   sufficiently heating the cavity surface from approximately about the first temperature to approximately about the second temperature for maintaining the substrate material above the glass transition temperature, wherein the first temperature is 110° F., wherein the second temperature is approximately 520° F.

3. The method according to claim 1, wherein prior to injecting the substrate step, further comprising the step of:
   orientating upper and lower mold halves of mold tool in an open position; and, after the injecting the substrate step, reconfiguring the mold halves from the open position to a closed position.

4. The method according to claim 1, wherein after the injecting the substrate step, further comprising the step of:
   permitting shrinkage of the substrate within the cavity.

5. The method according to claim 1, wherein after the flash-heating step, further comprising the step of:
   cooling the cavity surface; and, after the curing step,
   de-molding an interior trim component defined by the substrate and coating from the cavity surface.

6. A method for processing an interior trim component, comprising the steps of:
   adjusting a temperature of a cavity surface defined by a cavity to a first temperature;
   injecting a crystalline-based substrate into the cavity;
   injecting a coating onto the crystalline-based substrate within the cavity; and
   increasing the temperature of the cavity surface from the first temperature to a second temperature, wherein the second temperature is above a glass transition temperature of the crystalline-based substrate; and
   curing the coating on the crystalline-based substrate.

7. The method according to claim 6, wherein the first temperature is 110° F., wherein the second temperature is approximately 520° F.

8. The method according to claim 6, wherein prior to injecting a crystalline-based substrate step, further comprising the steps of:
   orientating upper and lower mold halves of a mold tool in an open position heating said cavity surface; and
   reconfiguring the mold halves from the open position to a closed position.

9. The method according to claim 6, wherein after the injecting a crystalline-based substrate step, further comprising the step of:
   permitting shrinkage of the crystalline-based substrate within the cavity.

10. The method according to claim 6, wherein after the increasing a temperature of the cavity surface step, further comprising the steps of:
    cooling the cavity surface; and de-molding an interior trim component defined by the crystalline-based substrate and coating from the cavity surface.

11. A method for processing an interior trim component in cavity of a mold tool, wherein the cavity is defined by a cavity surface having a cavity surface temperature, comprising the steps of:
heating the cavity surface such that the cavity surface temperature is equal to a first temperature;
injecting a substrate into the cavity such that the substrate contacts the cavity surface;
after the injecting the substrate step, permitting shrinkage of the substrate within the cavity;
after the permitting shrinkage step, injecting a coating onto the substrate;
after the injecting the coating step, flash-heating the cavity surface such that the cavity surface temperature is increased to approximately a second temperature that is greater than the first temperature;
after the flash-heating step, cooling the cavity surface;
after the cooling step and as a result of the flash-heating step, curing the coating on the substrate; and
after the curing step, de-molding, from the cavity surface, an interior trim component defined by the substrate and coating.

12. The method according to claim 11, wherein the substrate is a crystalline-based material defined by a glass transition temperature, wherein the flash-heating step includes the step of
sufficiently heating the cavity surface from approximately about the first temperature to approximately about the second temperature for maintaining the substrate material above the glass transition temperature, wherein the first temperature is approximately about 110° F., wherein the second temperature is approximately about 520° F.

* * * * *